United States Patent [19]
Safont et al.

[11] Patent Number: 5,533,801
[45] Date of Patent: Jul. 9, 1996

[54] ELECTRICALLY OPERATED HAND MIXER INCLUDING AN ATTACHMENT

[75] Inventors: Vicente Safont; Jose Millan, both of Barcelona; Antonio Rebordosa, Manresa; Alejandro Hernandez, Santa Oliva, all of Spain

[73] Assignee: Braun Aktiengesellschaft, Kronberg, Germany

[21] Appl. No.: 428,778

[22] Filed: Apr. 24, 1995

[30] Foreign Application Priority Data

Apr. 25, 1994 [DE] Germany .................. 44 14 415.6

[51] Int. Cl.⁶ .................................................. B01F 7/16
[52] U.S. Cl. ........................................ 366/249; 241/199.12
[58] Field of Search ................................. 366/251, 279, 366/348, 349, 129, 130, 241, 244, 245, 246, 247, 249, 285, 286; 241/199.12, 199.11, 101.1, 101.2

[56] References Cited

U.S. PATENT DOCUMENTS

| | | |
|---|---|---|
| 3,556,303 | 1/1971 | Diehold et al. . |
| 4,575,255 | 3/1986 | Kafka .................................... 366/129 |
| 4,645,352 | 2/1987 | Valbona ................................. 366/349 |
| 5,156,084 | 10/1992 | Lin ........................................ 366/130 |

FOREIGN PATENT DOCUMENTS

| | | |
|---|---|---|
| 0529287 | 7/1992 | European Pat. Off. . |
| 1162517 | 8/1960 | Germany . |
| 200071 | 7/1971 | Germany . |
| 435589 | 10/1967 | Switzerland . |

Primary Examiner—Robert W. Jenkins
Attorney, Agent, or Firm—Fish & Richardson

[57] ABSTRACT

In an electrically operated hand mixer (10) including an attachment (1), the latter is provided with a bowl (2) closable by a lid (9). The hand mixer has at least two first (90) and second (77) drive shafts adapted for detachable coupling with various processing tools (76), such as whisk attachments or kneading blades. One of the drive shafts (90) can be non-rotatably coupled with an output shaft (16), extending upwardly through the lid (9), when the hand mixer (10) is placed on the lid (9) of the attachment (1). The output shaft (16) is connected with a drivable blade (21, 22) in the interior of the bowl (2) for chopping foods. The non-rotatable connection is established by engagement of a first toothing (71) provided in the drive shaft (90) and a mating second toothing (70) provided on the output shaft (16). The drive shaft and/or output shaft (90, 16), according to the present invention, is axially displaceable in opposition to the force of a spring (67) so that, during installation, the hand mixer (10) will move into abutment on the lid (9) even in the absence of an engagement between the first (71) and second (70) toothings. This permits ease of coupling of the hand mixer (10) to the attachment (1) because automatic coupling engagement of the drive and output shafts (90, 16) takes place as soon as the motor starts to operate.

10 Claims, 4 Drawing Sheets

ELECTRICALLY OPERATED HAND MIXER INCLUDING AN ATTACHMENT

The present invention relates to an electrically operated hand mixer including an attachment, a bowl closable by a lid, at least two drive shafts adapted for detachable coupling with various processing tools, such as whisk attachments or kneading blades, one of the drive shafts being adapted to be non-rotatably coupled with an output shaft extending upwardly through the lid, when the hand mixer is placed on the lid of the attachment, the output shaft being connected with a drivable blade in the interior of the bowl for chopping foods, and the non-rotatable connection being established by engagement of a first toothing provided in the drive shaft with a mating second toothing provided on the output shaft.

An attachment for a hand mixer of this type is disclosed in Swiss patent specification 360 775, for example. Serving to drive the blade incorporated in the attachment is an electrically operated hand mixer which, on its bottom side, has two operating shafts provided as drive shafts. The one drive shaft is adapted to be coupled to an output shaft, which projects upwardly from the lid of the attachment, for driving the processing tool. To provide meshing engagement of the toothing provided on the drive shaft with the toothing of the output shaft associated with the drive shaft when the hand mixer is placed on the attachment, the hand mixer is required to be turned in relation to the attachment until the toothings mesh with each other. This is indicated to a user by the hand mixer overcoming a first stop. This stop is formed when the toothings only lie on top of each other, but are not yet in engagement. As soon as the first and second toothings engage each other, the hand mixer approaches the attachment until the bottom side of the housing of the hand mixer moves into abutment with the top side of the lid of the attachment. In this position, the hand mixer, along with the attachment, has reached the working position, and the toothings of the drive shaft and the output shaft are non-rotatably connected, i.e. they are in mesh with each other.

EP-B-0 221 392 discloses another attachment for chopping foods which is drivable by mounting an electrically operated hand mixer provided as a handheld blender. In this attachment, the comparatively blunt blade, which is rotatably provided in its bell on the handheld blender, engages the coupling mechanism provided on the attachment. Reliable coupling is ensured by ramps provided on the coupling mechanism which extend transversely to the attachment, by which ramps insertion of the blade and reliable engagement of the blade into the coupling mechanism is safely achieved.

An object of the present invention is to provide an electrically operated hand mixer as a drive unit including an attachment for chopping foods, such as parsley or onions, by which coupling of the hand mixer with the attachment is facilitated, there being no need for alignment actions by a user.

This object is achieved by the features of patent claim 1. The hand mixer can be mounted easily on the output shaft according to the present invention by the output shaft, movable into engagement with the drive shaft of the hand mixer, or the drive shaft itself, being displaceable in opposition to the force of a spring, and the hand mixer can lower itself due to its force of gravity until it abuts on the lid of the attachment. In this arrangement, it is irrespective whether the toothing provided on the output shaft engages already the toothing provided on the drive shaft of the hand mixer, or whether they are not yet in meshing engagement, that means, merely abut on each other. In the first case, the toothings will slide unhinderedly into each other when the hand mixer is lowered, and there is no need for the output shaft of the attachment or the drive shaft to displace axially in opposition to the force of the spring. In the second case, where, on placement of the hand mixer, the toothing provided on the drive shaft is pushed against the toothing of the output shaft, the drive shaft or output shaft, on further displacement of the hand mixer towards the attachment, is displaced in opposition to the force of the spring until the housing of the hand mixer bears against the lid of the attachment. Thus, according to the present invention, either the output shaft of the attachment, the drive shaft of the hand mixer or even both couplings can be provided so as to be axially slidable. The only thing important is that at least one coupling is displaced.

When the hand mixer is switched on, the output shaft, as soon as the tooth gaps provided on the drive shaft are in alignment with the toothings provided on the output shaft, will snap resiliently into the drive shaft or vice-versa due to the force of the spring, and the coupling action is terminated. Now, the drive shaft is non-rotatably coupled to the output shaft, and the processing tool accommodated in the attachment can be rotated by the gear unit. The arrangement according to the present invention facilitates manipulation when placing the hand mixer on the attachment and, thus, makes the appliance particularly easy to handle.

According to the features of patent claim 2, the pin engaging into the second drive shaft of the hand mixer causes a non-rotatable connection between the hand mixer and the attachment so that the reaction forces resulting during operation of the hand mixer due to the cutting forces caused by the blade will be transmitted on the attachment in a simple fashion. This prevents the hand mixer from turning in relation to the attachment during operation. In this configuration, the pin serves only as a centering and supporting device. Therefore, the pin is not provided with a toothing to engage the toothing of the second drive shaft. According to another development of the present invention, the pin serves only as a centering and supporting device in a circumferential direction for the second drive shaft and, thus, for the entire hand mixer so that rotation of the hand mixer around its own axis is not permitted during operation. To this end, the drive shaft is guided on the pin so as to be freely rotatable. Because the hand mixer is prevented from turning around its own axis, when the hand mixer is seated on the attachment, by simultaneous engagement of both the output shaft and the pin into the drive shafts provided to this end, it is favorable according to the present invention that the output shaft provided with the toothing is axially displaceable in opposition to the force of a spring. This is because the hand mixer can be seated easily on the attachment due to this arrangement, without the second toothing provided on the output shaft being required to engage the first toothing provided on the drive shaft. According to the present invention, the meshing engagement is allowed to take place only after the appliance has been switched on, and, as soon as the gaps provided on the first toothing are in alignment with the teeth provided on the second toothing, the output shaft moves into the drive shaft, thereby establishing a non-rotatable coupling between these parts.

Of course, it is also possible within the scope of the present invention that, for the drive shaft usually provided as a sleeve with an internal toothing, a shaft with an external toothing may be used, and, for the output shaft provided as a shaft with an external toothing, a sleeve with an internal toothing may be used.

The features of patent claim 3 permit a firm seat of the hand mixer on the attachment. The locking arrangements provided for the processing tools, such as whisk attachment or kneading blade, additionally serve as a fastening means on the pin. However, according to another development of the present invention, the pin must be shaped such that it resiliently engages the locking arrangement provided on the second drive shaft of the hand mixer. Further, this results in the benefit that a very easy detachment and removal of the hand mixer is achieved by causing the locking arrangement on the drive shaft, by operation of the ejector means existing on the hand mixer, to permit ease of removal of the hand mixer from the attachment.

According to the features of patent claim 4, the locking arrangement provided on the drive shaft will slide along the pin during operation of the attachment, however, the sliding friction being very low due to the materials chosen. However, it is also possible within the scope of the present invention that the pin is rotatably arranged in the lid so that relative rotation is not required to take place between the locking arrangement and the pin because now the pin and the lid perform this rotation (see claim 5).

According to the features of patent claim 6, the output shaft can be displaced easily in an axial direction due to a gearing interposed between the output shaft and the processing tools, which are rotatably accommodated in the bowl of the attachment. It is ensured thereby that the toothing provided on the output shaft is always in mesh with the toothed wheel on the side of the gearing during the axial displacement. It is particularly favorable that the output shaft is pivoted on a centering pin that is non-rotatably mounted in the bottom part of the gear mount (see claim 7). This permits axial displacement of the output shaft on the centering pin in a particularly easy fashion.

According to the features of patent claim 8, a particularly simple arrangement of the output shaft and a second toothed wheel is achieved. If made of plastics, these parts can be of integral design.

According to a further development of the features of patent claim 9, an attachment is achieved in which the output shaft is always reset reliably into its initial position by the spring when the hand mixer is removed from the attachment. The initial position of the output shaft will also be reliably reached when the output shaft engages non-rotatably into the first toothing of the drive unit during the coupling action when the hand mixer is operated.

According to the features of claim 10, the coupling of either the hand mixer or the attachment can be displaced in an axial direction until the hand mixer abuts on the attachment, if the toothings do not align with each other immediately upon engagement.

One embodiment of the present invention is illustrated in the drawings and will be explained in detail in the following. In the drawings, FIG. 1 is a longitudinal cross-section taken through the attachment according to the present invention;

Figure 5:
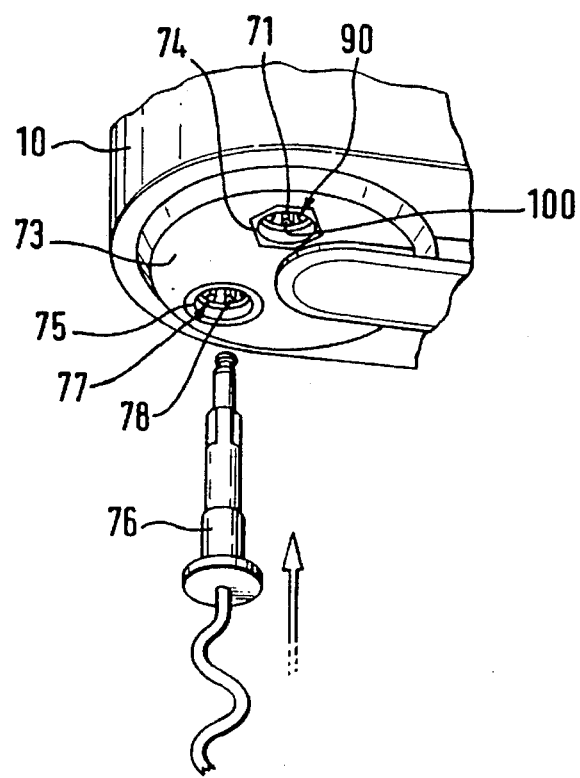
Figure 4:
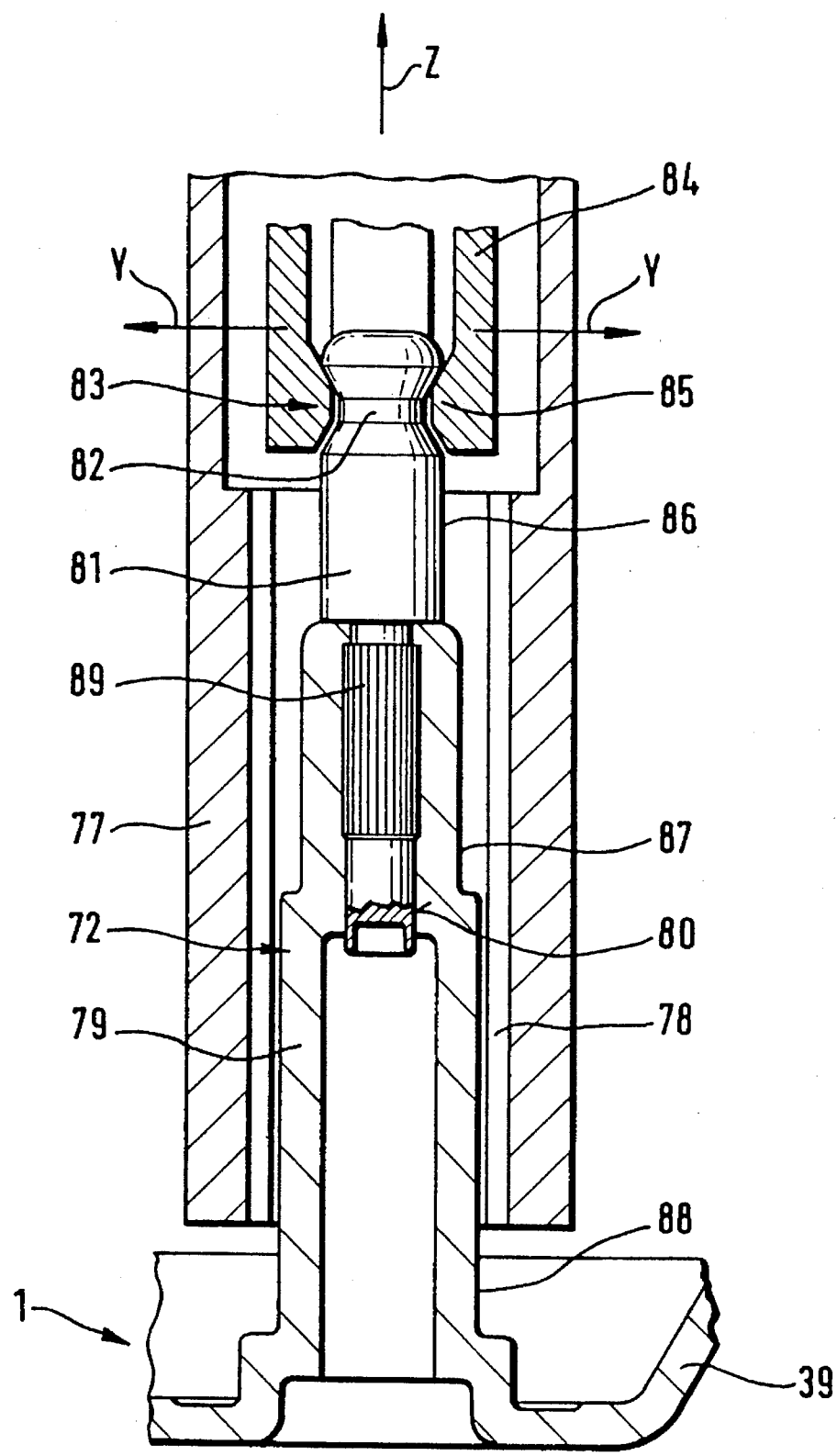

FIG. 4 is a longitudinal cross-section taken through the pin provided on the lid of the attachment, snapped into which pin is the locking arrangement provided on the hand mixer, without a non-rotatable engagement of the associated toothing on the pin being provided, and FIG. 5 is a top view from below on the hand mixer in the area of the accommodation apertures, that condition being shown where a kneading blade is inserted into the drive shaft with longitudinal toothing provided behind the accommodation aperture.

According to FIGS. 1, 2 and 3, the attachment 1 comprises a bowl 2 which, in turn, is composed of a cylindrical polygonal outside wall 3 with a bottom 4 closing the outside wall 3 from below. The bottom 4 includes an annular collar 5 being an extension of the outside wall 3 and having its downwardly directed and annularly arranged recess 6 closed by a plate 7 which, on the one hand, serves as an anti-slip base support for the attachment 1 during operation and, on the other hand, serves as a lid closing the feed opening 8, when the lid 9, which so far served for closing according to FIGS. 1 to 3, has been removed from the feed opening 8 of the bowl 2. The so closed bowl 2 can then be placed in the refrigerator to cool the already chopped foods in the bowl.

Lid 9 serves to accommodate a gearing 14 which, in this configuration, is a reduction gear and transfers the rotation M, introduced at the output shaft 16 by the hand mixer 10, to the output 11 projecting from the bottom 17 of the gear mount 9, from where the rotation is transferred to the blades 21, 22. The output 11 comprises projections 19 arranged over the periphery and intermediate recesses 20 into which the carriers 18, extending upwardly from the free end of the hub 15, engage for non-rotatable entrainment when the gear mount 9 is placed on the bowl 2.

Figure 1:
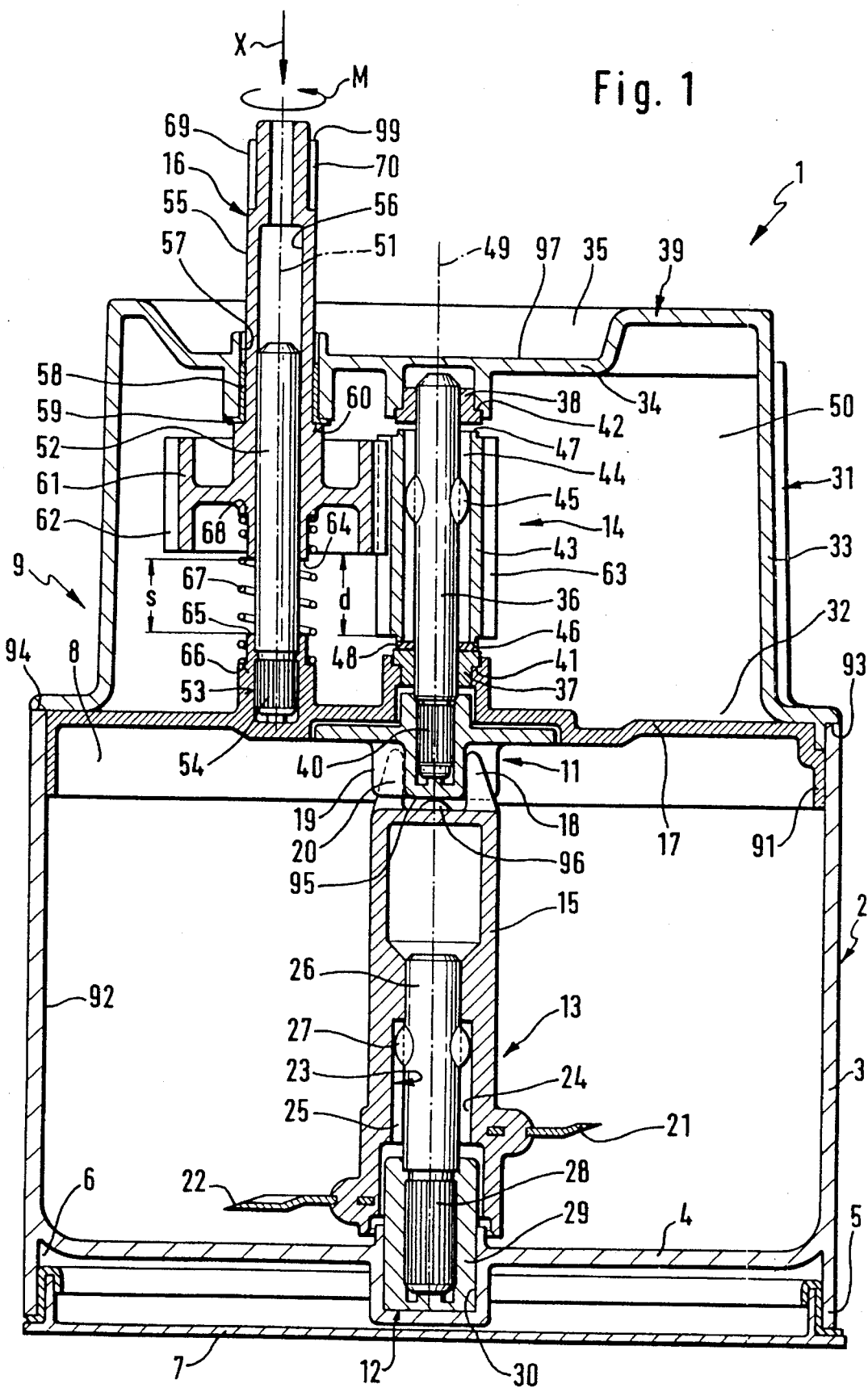
Figure 2:
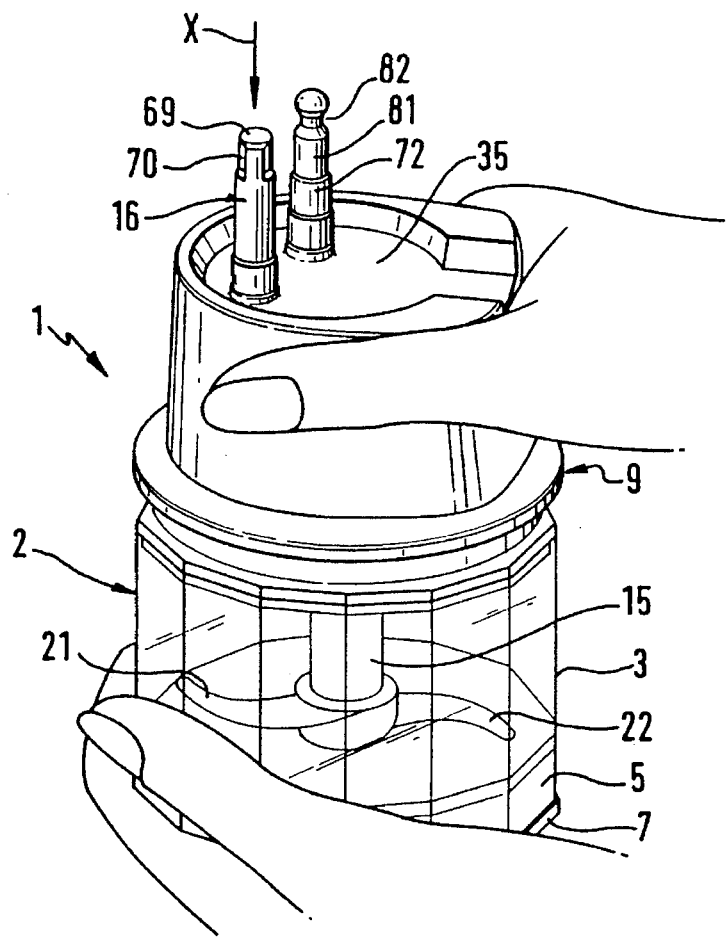
FIG. 2 is a perspective lateral view from the right on the attachment according to FIG. 1 which is in the hands of a user.
Figure 3:
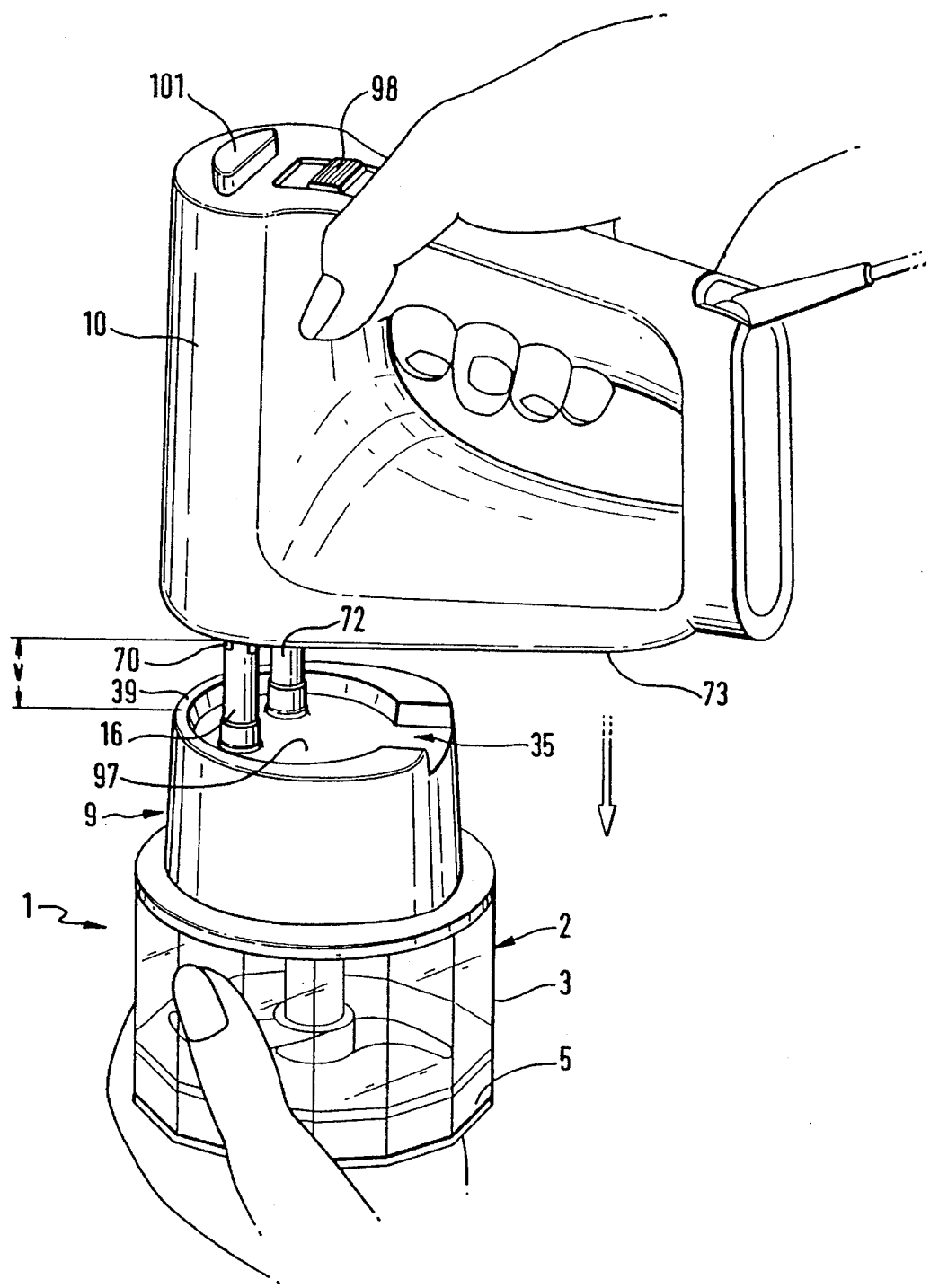
FIG. 3 is a perspective view of the attachment according to FIG. 3, however, the hand mixer being just mounted on the attachment.

According to FIGS. 1 to 3, diametrically opposed sicle-shaped blades 21, 22 are provided on the hub 15 proximate the bottom 4, the blade 21 extending above the blade 22 in the bowl 2. The hub 15 includes a stepped bore 23, the second portion 24 of which has a longitudinal toothing 25 for non-rotatable engagement by projections 27 provided on an axis 26. The lower end of axis 26 has a longitudinal toothing 28 on which a sleeve 29 is press fit. Sleeve 29 slides in a bore 30 centrally arranged in the bottom 4. Instead of splitting the axis 26 and the hub 15, an integral design variant is also possible. The axis 26 of this variant engages the bore 30, likewise through the sleeve 29, to be freely rotatably centered there.

According to FIG. 1, the gear housing 9 is composed of a pot-shaped housing 31, which extends upwardly from the bottom part 17 and has a downwardly directed opening 32 closed by the bottom part 17. Closing can be achieved by, for example, welding, cementing or any other fastening means providing sealing. Further, the pot-shaped housing 31 includes a substantially U-shaped lateral wall 33 which, from the top, is closed by the bottom part 34 being integrally designed with the lateral wall 33. The bottom part 34 includes a recess 35 which serves to accommodate the bottom area of the hand mixer 10 when it is mounted on the attachment 1, as can be seen in FIG. 3. A particularly safe positioning of the hand mixer 10 on the gear mount 9 is achieved thereby.

According to FIG. 1, the output 11 extending downwardly from the bottom part 17 is coupled to a shaft 36 which, by way of sliding bearings 37, 38 provided on its two ends, is pivotably mounted on the bottom part 17, on the one hand, and on the upper part 39, on the other hand. In this configuration, too, the output 11 shaped from plastic is non-rotatably shrunk fit on the longitudinal toothing 40 provided at the bottom free end of the shaft 36. The two sliding bearings 37, 38 include annular steps 41, 42, by way of which the sliding bearings 37, 38 are axially supported on the lid 9. Intermediate the two sliding bearings 37, 38, a first toothed wheel 43 is centered on the shaft 36 and is in non-rotatable engagement therewith by way of a longitudinal toothing provided in the first toothed wheel 43 and being in engagement with diametrically opposed carrier means 45 provided on the shaft 36. This engagement establishes a non-rotatable, yet axially slidable connection between the first toothed wheel 43 and the shaft 36. The first toothed wheel 43 has end surfaces 46, 47 on its frontal ends which serve as abutment surfaces on the sliding bearings 37, 38. To minimize friction and wear between the end surface 46 and the sliding bearing 37 (because the assembly of shaft 36, first toothed wheel 43 and output 11 takes support at this point), a slide ring 48 is provided between the toothed wheel 43 and the lower sliding bearing 37 to minimize in particular the wear on the first toothed wheel 43 made of plastics.

While the shaft 36 and the hub 15, according to FIG. 1, are arranged in the center of the attachment 1 and, thus, lie on the central axis 49 of the attachment 1, a centering pin 52 is arranged, laterally of this arrangement in the gearing chamber 50 formed by the lid 9, on another longitudinal axis 51 extending in parallel to the central axis 49. The centering pin 52 is press fitted into a bore 53 in the bottom part 17 by way of the longitudinal toothing 54 provided on the free end of the centering pin 52. On its other side, the centering pin 52 is encompassed by the sleeve-shaped output shaft 55 containing a bore 56, the bore 56 serving as a sliding bearing between the centering pin 52 and the output shaft 16.

The external surface 55 of the output shaft 16 is rotatably mounted in a bore 57 provided in the upper part 39. However, to reduce wear, another sliding bearing 58, as can be seen in FIG. 1, can be provided between the bore 57 and the external surface 55. Sliding bearing 58 has an annular step 59 which serves to abut on an annular extension 60 provided on the external surface 55 to provide the output shaft 16 according to FIG. 1 upwards with a stop on the upper part 39.

According to FIG. 1, a second toothed wheel 61 is provided in the bottom area of the output shaft 16, its longitudinal toothing 62 meshing with the longitudinal toothing 63 provided on the first toothed wheel 43. As can clearly be seen in FIG. 1, the length of the first toothed wheel 43 with its associated longitudinal toothing 63 exceeds by far the length of the second toothed wheel 61 with its longitudinal toothing 62. This projecting length "d" corresponds to the travel "s" or, respectively, exceeds the travel "s" which the output shaft 16 with its second toothed wheel 61 can cover in a downward direction, according to FIG. 1, until its free end 64 abuts on the end surface 65 of the bottom part 17 provided at the free end of the bore 53. In turn, the travel "s" is required to be as large as, or larger than, the travel "v". The travel "v" results from the upper edge 99 of the second toothing 70 of the drive shaft 16 abutting planely on the lower edge 100 of the drive shaft 90 of the first toothing 71. In this case, the amount "v" results between the bottom side of the housing 73 and the bottom of the recess 35.

According to FIG. 1, a compression spring 67 provided as a spiral spring is compressed between the annular surface 66 of the bottom part 17 and, on its other side, a stop surface 68 which is provided at the lower end of the output shaft 16 or the second toothed wheel 61, respectively. As a result, the output shaft 16 with its stop 60 is pushed against the annular step 59 and permanently retained there in resilient abutment as long as pressure is not exerted from the top on the output shaft 16.

According to FIGS. 1 and 2, the free end 69 of the output shaft 16 projects through the bore 57 upwardly out of the upper part 39, a second toothing 70 being provided on the free end 69 for engagement with a first toothing 71 provided in the hand mixer 10 when the hand mixer 10, according to Figure 3, is mounted on the attachment 1 in the position as shown.

Further, as can be seen in FIGS. 1 to 3, the longitudinal axis 51 of the output shaft 16 extends quite far at the rim of the attachment 1 to ensure that the point of gravity of the hand mixer is proximate the central line 49 because the housing of the hand mixer 10 extends over the attachment 1 radially outwardly. Tilting of the assembly of hand mixer 10 and attachment 1 is largely avoided thereby even during operation.

As can be seen in FIG. 2, a pin 72 beside the output shaft 16 projects upwardly from the upper part 39 of the lid 9 and extends in parallel to the output shaft 16. Pin 72 cannot be seen in FIG. 1, though, because it extends behind the output shaft 16 in the drawing plane. The distance between the output shaft 16 and the pin 72 is equally large as the distance of the accommodation bores 74, 75 which are provided on the bottom side 73 of the hand mixer 10 and serve, on the one hand, to accommodate the processing tools 76, such as whisk attachments, kneading blades, etc., and, on the other hand, for accommodating the output shaft 16 and the pin 72, when the hand mixer 10 is intended as a drive unit for the attachment 1. For this purpose, the free end of the pin 72 is so designed as the free end of the processing tool 76.

The pin 72 is shown on an enlarged scale in FIG. 4. In this view, the position is shown where the hand mixer 10 is being mounted on the attachment 1. Output shaft 77, which is arranged rotatably in the hand mixer 10 and provided with a longitudinal toothing 78, encompasses the pin 72. Pin 72 comprises a sleeve-shaped portion 79, integrally designed with the upper part 39, and containing a bore 80 in which a pin 81 made of metal is attached in positive connection therewith. At its free end, pin 81 has an annular groove 82 in which the resilient arms 85 engage which are provided on the hand mixer 10 within the drive shaft 77. The four resilient arms 85 are diametrically opposed each other and can be pushed resiliently radially outwardly in the direction Y by way of an ejector (not shown) provided on the hand mixer 10 and actuated by the actuating button 86 (see FIG. 3). Due to this action, the projections 84 provided on the arms 85 will release the annular groove 82. This permits upward detachment of the hand mixer 10 from the attachment 1 in the direction Z. When the whisk attachments or kneading blades 76 in FIG. 5 are used, they will drop out on pressing the actuating button 80.

As far as the end in the area of the annular groove 82 and the diameters of the portions 86, 87, 88 and their pertinent lengths is concerned, they are adapted to the dimensions of the free ends of the processing tools 76, such as whisk attachments or kneading blades, thereby permitting locking and centering of the hand mixer on the pin 72 without the need for intricate, special fastening means. The only difference over the pin 72 and the end of the processing tools 76 is that no second toothing 70 is provided on the pin 72, as it is provided on the output shaft 16 and the free ends of the processing tools 76. The result is that the pin 72 serves only as a centering arrangement for the second drive shaft 77 of the hand mixer 10. Co-rotation of the arms 85 with the drive shaft 77 causes development of low friction between the projections 84 and the annular groove 82, however, without considerable wear, because at least bolt 81 is made of metal and spray-coated by the portion 79. Thus, the longitudinal toothing 89 spray-coated by the bore 80 is non-rotatably connected with the portion 79.

The second drive shaft 77 (see FIG. 5) is coupled to the gearing (not shown) of the hand mixer 10 by way of a toothed wheel (not shown). Simultaneously, the first drive shaft 90 (see FIG. 5) which, along with its locking device (not shown), is identical to the arrangement shown in FIG. 4, is coupled to the gear device (not shown) of the hand mixer 10 also by way of a toothed wheel which is not illustrated in the drawing, the two drive shafts 90, 71 working in opposite directions.

The operation of the attachment according to the present invention is as follows:

After foods (not shown) are loaded, first of all, the gear mount 9 designed as a lid is placed on the feed opening 8 of the bowl 2 until the annular collar 91 provided on the bottom part 17 engages the inside wall 92 such that the upper edge 93 is in sealing abutment on the edge 94 of the bowl 2. Due to the tight closing of the bowl, the very sharp blade 21, 22 will not injure a user during operation. Of course, it goes without saying that the axis 26 with its sleeve 29 was inserted into the bore 30 beforehand and that the hub 15 including the sharp blades 21, 22 was seated on the axis 26 in non-rotatable engagement therewith. With the bowl 2 closed, the carrier 18 provided on the hub 15 engages one of the recesses 20 and, simultaneously, the free end 95 of the output 11 makes catch at a protrusion 96 projecting from the free end of the hub 15. However, a small clearance may also be provided inbetween. The only thing important is that the processing tool 13 does not have an excessive clearance in operation and, thus, is avoided to move too far upwards.

According to FIG. 3, the hand mixer 10 is now mounted on the attachment 1 so that the output shaft 16 moves into the accommodation bore 74 and the pin 72 moves into the accommodation bore 75. When the first toothing 71 provided on the first drive shaft 90 is adjusted such as to be in alignment with the second toothing 70 provided on the output shaft 16, the appliance can be displaced sufficiently until the projections 84 of the arms 85 resiliently engage the annular groove 82 of the pin 72. In this arrangement, the hand mixer 10 simultaneously abuts in about flush with the bottom 97 of the recess 35. A detachable, yet rigid connection is thereby established between the hand mixer 10 and the attachment 1.

If the toothing 71 of the output shaft 90 of the hand mixer 10 is not in alignment with the associated second toothing (not shown), when the hand mixer 10 is further lowered, the output shaft 16 displaces in the direction X, according to FIGS. 1 and 2, until engagement of the locking arrangement 83 according to FIG. 4.

When the hand mixer 10 is switched on by depressing the on/off button 98 in FIG. 3, the output shaft 16 will displace upwardly in opposition to the direction of displacement X when the first toothing 71 on the drive shaft 90 corresponds with the mating second toothing 70 on the output shaft 16. Non-rotatable driving engagement between drive shaft 90 and output shaft 16 is provided already after less than one rotation. The torque transmission M is effected via the second toothed wheel 61 to the first toothed wheel 43, from where this rotation is transferred through the shaft 36 to the output 11. The rotating output 11 now entrains the carrier 18 by way of its projections 19, the hub 15 with the associated blades 21, 22 being caused to rotate as a result. Foods in the bowl 2 will thus be chopped in a very fast way. Apart from beating, mixing, kneading and frothing foods, the attachment 1 permits also chopping foods such as parsley, onions, etc.

When the chopping action is completed, the gear mount 9 can be removed from the bowl 2. Then, hub 15 including the processing tools 21, 22 and the axis 26 can be taken out of the bowl 2. The chopped foods can now be removed from the bowl 2, or the bowl 2, for storing the foods, can be placed in a refrigerator, for example. To this end, the plate 7 must be removed from the bottom 4 and inserted into the feed opening 8, thereby closing the bowl 2 tightly.

We claim:

1. An attachment for an electrically operated hand mixer having at least a first drive shaft adapted for detachable coupling with various processing tools, the first drive shaft including a first toothing, the attachment comprising:

a bowl;

a lid closable on the bowl;

an output shaft with a free end and a lower end, the free end of the output shaft extending upwardly through the lid and adapted to be non-rotatably coupled with the first drive shaft of the hand mixer when the hand mixer is placed on the lid, the output shaft providing a matching second toothing which mates with the first toothing on the first drive shaft, and the non-rotatable coupling being established by engagement of the first toothing provided on the first drive shaft of the hand mixer with the matching second toothing provided on the free end of the output shaft;

a spring coupled between the output shaft and the lid, wherein the output shaft is axially displaceable into the lid in opposition to the force of the spring during coupling action of the hand mixer and the attachment;

a blade assembly in the bowl for chopping foods; and a second shaft rotatably coupled to the output shaft so that rotation of the output shaft causes the second shaft to rotate, the second shaft including a coupling which transfers rotation of the second shaft to the blade assembly.

2. An attachment as claimed in claim 1, further comprising a pin projecting upwardly from the lid and positioned to center the hand mixer when the hand mixer is placed on the lid, a free end of the pin adapted to be coupled to a second drive shaft of the hand mixer.

3. An attachment as claimed in claim 2 wherein the free end of the pin is so formed as to be detachably coupled to the second drive shaft of the hand mixer in a direction axial to the pin by a resilient locking arrangement in the second drive shaft.

4. An attachment as claimed in claim 3 wherein the free end of the pin is rotatably coupled to the second drive shaft of the hand mixer and the other end of the pin is non-rotatably coupled to the lid.

5. An attachment as claimed in claim 3 wherein the other end of the pin is rotatably coupled to the lid.

6. An attachment as claimed in claim 1, wherein the second shaft is rotatably coupled to the output shaft by way of a toothed wheel gearing comprising at least a first toothed wheel and a second toothed wheel, wherein the toothed wheels each have a longitudinal toothing, and wherein the teeth of the two toothed wheels are so long as to establish an engagement between the two toothed wheels in every axial position of the axially displaceable output shaft.

7. An attachment as claimed in claim 6 wherein the lid is formed of a gear mount comprised of an upper part, a lateral wall, a bottom part, and a centering pin non-rotatably mounted in the bottom part, wherein the output shaft is pivoted about the centering pin.

8. An attachment as claimed in claim 7 wherein the output shaft is furnished with the second toothed wheel which engages with the first toothed wheel in the gear mount.

9. An attachment as claimed in claim 8 wherein the spring is interposed between the second toothed wheel and the bottom part of the gear mount and concentrically encompasses the centering pin.

10. An attachment as claimed in claim 1 wherein, when the attachment is attached to the hand mixer, the hand mixer moves into abutment on the lid even in the absence of an engagement between the first toothing on the first drive shaft and the matching second toothing on the free end of the output shaft.

* * * * *

UNITED STATES PATENT AND TRADEMARK OFFICE
CERTIFICATE OF CORRECTION

PATENT NO.  : 5,533,801

DATED       : July 9, 1996

INVENTOR(S) : Vicente Safont, et al.

It is certified that error appears in the above-identified patent and that said Letters Patent is hereby corrected as shown below:

Title page, item [56], under FOREIGN PATENT DOCUMENTS, please add the following references:

```
--    EP0221392    5/16/90    Europe
      CH360775     4/20/62    Switzerland
      DEU1739688   6/29/56    Germany  --;
```

Col. 3, line 60, please delete the carriage return after "to"; and

Col. 8, line 52, please delete "1," and insert --1--.

Signed and Sealed this

Twenty-fifth Day of November, 1997

Attest:

BRUCE LEHMAN

*Attesting Officer*      *Commissioner of Patents and Trademarks*